United States Patent
Fujita (10) Patent No.: US 8,264,327 B2
(45) Date of Patent: Sep. 11, 2012

(54) AUTHENTICATION APPARATUS, IMAGE SENSING APPARATUS, AUTHENTICATION METHOD AND PROGRAM THEREFOR

(75) Inventor: Atsushi Fujita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 699 days.

(21) Appl. No.: 12/470,278

(22) Filed: May 21, 2009

(65) Prior Publication Data
US 2009/0309700 A1   Dec. 17, 2009

(30) Foreign Application Priority Data

Jun. 16, 2008  (JP) .................. 2008-156995
Apr. 23, 2009  (JP) .................. 2009-105610

(51) Int. Cl.
*G08B 21/00* (2006.01)
(52) U.S. Cl. ............ 340/5.83; 340/5.52; 340/5.53; 340/5.82; 382/115; 382/118; 382/124; 713/186
(58) Field of Classification Search ............. 340/5.52, 340/5.53, 5.82, 5.83; 382/115, 118, 124; 713/186
See application file for complete search history.

(56) References Cited

U.S. PATENT DOCUMENTS

| | | | |
|---|---|---|---|
| 6,466,685 B1 | 10/2002 | Fukui et al. | |
| 6,993,166 B2 * | 1/2006 | Lo et al. | 382/124 |
| 7,885,433 B2 * | 2/2011 | Yano et al. | 382/115 |
| 2007/0189585 A1 * | 8/2007 | Sukegawa et al. | 382/118 |
| 2009/0135269 A1 * | 5/2009 | Nozaki et al. | 348/222.1 |

FOREIGN PATENT DOCUMENTS

| | | |
|---|---|---|
| JP | 2000-030065 | 1/2000 |
| JP | 2003-323615 | 11/2003 |
| JP | 2004-038531 | 2/2004 |
| JP | 2007-079894 | 3/2007 |
| JP | 2007-088993 | 4/2007 |

* cited by examiner

*Primary Examiner* — Jennifer Mehmood
*Assistant Examiner* — Mark Rushing
(74) *Attorney, Agent, or Firm* — Cowan, Liebowitz & Latman, P.C.

(57) ABSTRACT

The authentication apparatus calculates authenticities based upon similarity between detected face image data and a plurality of items of registered face image data prepared beforehand. In accordance with the calculated authenticities, the apparatus causes a display unit to display, as the result of authentication, either a registered name indicating registered face image data calculated to have a maximum authenticity from among the plurality of items of registered face image data, or any group name to which the registered face image data calculated to have the maximum authenticity and other registered face image data belong.

7 Claims, 11 Drawing Sheets

FIG. 3

| REGISTERED NAME | A | B | C | D | E |
|---|---|---|---|---|---|
| GROUP NAME | Family | Friend | Family | Family | NONE |

RESULT OF AUTHENTICATION WITH RESPECT TO A

| OBJECT | 111 |
|---|---|
| AUTHENTICITY | Eva1 |

RESULT OF AUTHENTICATION WITH RESPECT TO B

| OBJECT | 111 |
|---|---|
| AUTHENTICITY | Eva2 |

RESULT OF AUTHENTICATION WITH RESPECT TO C

| OBJECT | 111 |
|---|---|
| AUTHENTICITY | Eva3 |

RESULT OF AUTHENTICATION WITH RESPECT TO D

| OBJECT | 111 |
|---|---|
| AUTHENTICITY | Eva4 |

RESULT OF AUTHENTICATION WITH RESPECT TO E

| OBJECT | 111 |
|---|---|
| AUTHENTICITY | Eva5 |

| NAME | A | B | C | D | E |
|---|---|---|---|---|---|
| GROUP NAME 1 | | | Brother | Brother | |
| GROUP NAME 2 | Family | | Family | Family | |

RESULT OF AUTHENTICATION WITH RESPECT TO A

| OBJECT | 311 | 312 | 313 |
|---|---|---|---|
| AUTHENTICITY | Eva21 | Eva31 | Eva41 |

RESULT OF AUTHENTICATION WITH RESPECT TO B

| OBJECT | 311 | 312 | 313 |
|---|---|---|---|
| AUTHENTICITY | Eva22 | Eva32 | Eva42 |

RESULT OF AUTHENTICATION WITH RESPECT TO C

| OBJECT | 311 | 312 | 313 |
|---|---|---|---|
| AUTHENTICITY | Eva23 | Eva33 | Eva43 |

RESULT OF AUTHENTICATION WITH RESPECT TO D

| OBJECT | 311 | 312 | 313 |
|---|---|---|---|
| AUTHENTICITY | Eva24 | Eva34 | Eva44 |

RESULT OF AUTHENTICATION WITH RESPECT TO E

| OBJECT | 311 | 312 | 313 |
|---|---|---|---|
| AUTHENTICITY | Eva25 | Eva35 | Eva45 |

AUTHENTICATION APPARATUS, IMAGE SENSING APPARATUS, AUTHENTICATION METHOD AND PROGRAM THEREFOR

BACKGROUND OF THE INVENTION

1. Field of the Invention

The present invention relates to an authentication technique.

2. Description of the Related Art

Research relating to authentication techniques is proceeding. Such techniques include biometrics, in which features peculiar to individuals, such as a fingerprint, voiceprint, the iris or a face image, are compared with a database to identify the individual automatically, thereby realizing an advanced user interface and security.

Further, the specification of Japanese Patent Laid-Open No. 2003-323615 discloses a technique in which personal authentication based upon a face image is applied to a digital camera or the like to assist in the organizing and classification of images after capture. The specification of Japanese Patent Laid-Open No. 2007-088993 discloses a technique for changing image processing on a per-individual basis using results of personal authentication.

The specification of Japanese Patent Laid-Open No. 2007-079894 discloses a technique for changing a display channel in accordance with the result of detection of a face image contained in image data, and also proposes a method of identifying the content of an image using a face detection function and conveying such content to the user in an easily understandable manner.

In personal authentication, however, authentication accuracy declines owing to a change in the object at the time of image capture or a difference in the shooting environment with regard to face image data previously registered. As a consequence, erroneous authentication results are displayed and the user feels stressed and is impatient ascribable to erroneous authentication. In particular, if objects having similar features, as is the case with brothers and sisters, etc., have been registered, there is a greater possibility that erroneous authentication will occur.

SUMMARY OF THE INVENTION

The present invention has been devised in view of the foregoing problems and provides a personal authentication technique that makes it possible to reduce instances where a user is notified of erroneous authentication results.

In order to solve the aforementioned problems, the present invention provides an authentication apparatus comprising: an authentication unit configured to compare face image data detected from image data and a plurality of items of registered face image data and calculating authenticities based upon similarity between the detected face image data and the plurality of items of registered face image data; and a result determination unit configured to cause a display unit to display result of authentication determined in accordance with the authenticities calculated by the authentication unit; wherein in accordance with the authenticities, the result determination unit adopts, as the result of authentication, either a registered name indicating registered face image data calculated to have the maximum authenticity from among the plurality of items of registered face image data, or any group name to which have the maximum authenticity and other registered face image data belong.

The present invention also provides an image sensing apparatus comprising: an image sensor configured to sense the image of an object and generate image data; a face detection unit configured to detect face image data of a person included in the image data obtained by the image sensor; a face image data recording unit in which a plurality of items of registered face image data have been registered in advance; a group information recording unit configured to create a group that includes at least one item of registered face image data from among the plurality of items of registered face image data, and associating registered names of face image data that belong to the group and a group name; an authentication unit configured to compare the face image data detected by the face detection unit and the plurality of items of registered face image data registered in the face image data recording unit and calculating authenticities based upon similarity between the detected face image data and the plurality of items of registered face image data; a result determination unit configured to determine result of authentication in accordance with the authenticities calculated by the authentication unit; and a display unit configured to display the result of authentication determined by the result determination unit; wherein in accordance with the authenticities, the result determination unit adopts, as the result of authentication, either a registered name indicating registered face image data calculated to have the maximum authenticity from among the plurality of items of registered face image data, or any group name to which the registered face image data calculated to have the maximum authenticity and other registered face image data belong.

The present invention also provides an authentication method executed by a computer, comprising: an authentication step of comparing face image data detected from image data and a plurality of items of registered face image data and calculating authenticities based upon similarity between the detected face image data and the plurality of items of registered face image data; and a result determination step of causing a display unit to display result of authentication determined in accordance with the authenticities calculated at the authentication step; wherein in accordance with the authenticities, the result determination unit adopts, as the result of authentication, either a registered name indicating registered face image data calculated to have the maximum authenticity from among the plurality of items of registered face image data, or any group name to which the registered face image data calculated to have the maximum authenticity and other registered face image data belong.

Further features of the present invention will become apparent from the following description of exemplary embodiments with reference to the attached drawings.

DESCRIPTION OF THE EMBODIMENTS

Embodiments for practicing the present invention will now be described in detail with reference to the accompanying drawings.

The embodiments set forth below are examples for realizing the present invention and are to be suitably modified or changed depending upon the configuration and various conditions of the apparatus to which the present invention is applied. The present invention is not limited to the embodiments that follow.

[First Embodiment]

Figure 1:
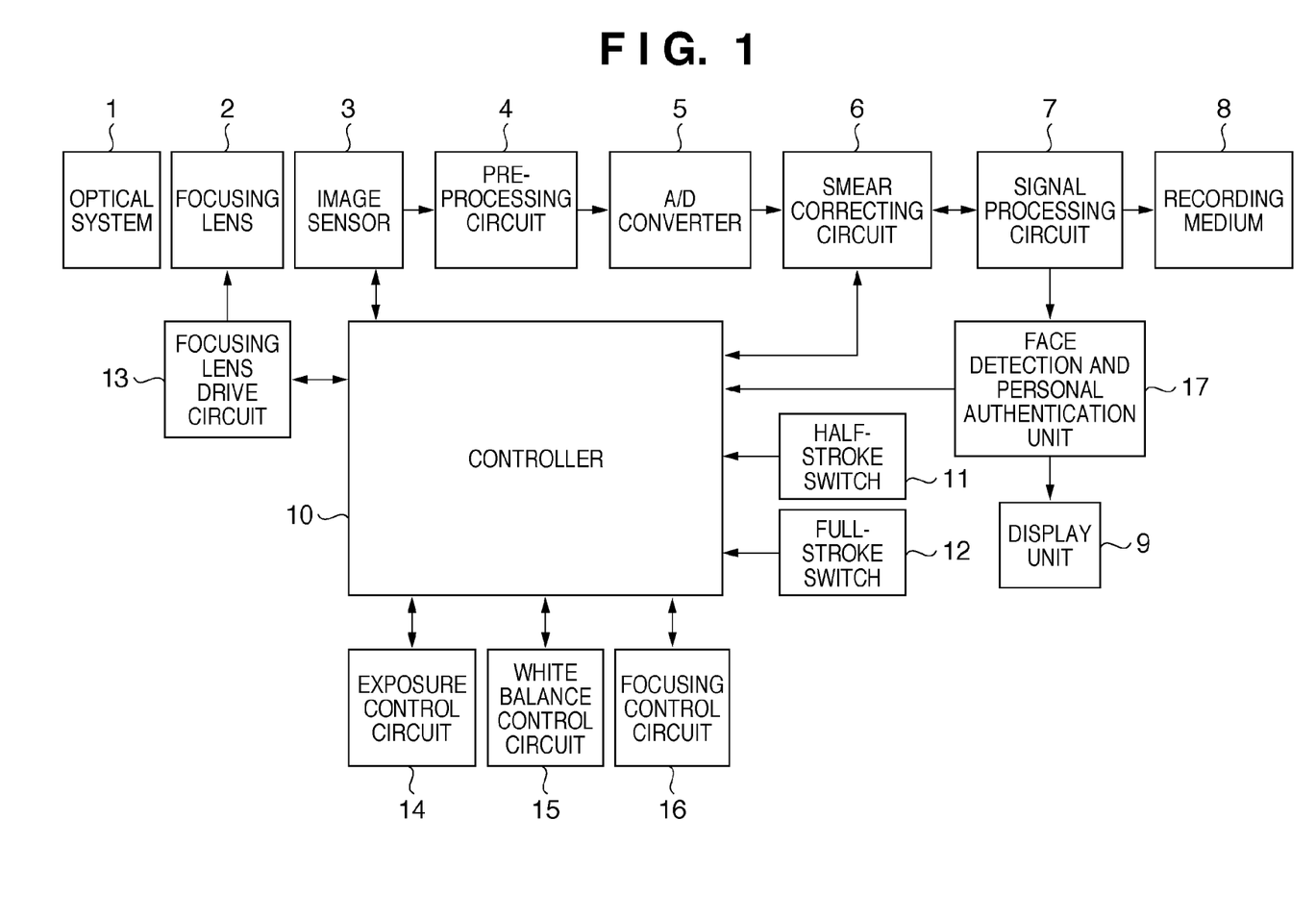
FIG. 1 is a block diagram illustrating the configuration of a digital camera according to a first embodiment of the present invention.
Figure 2:
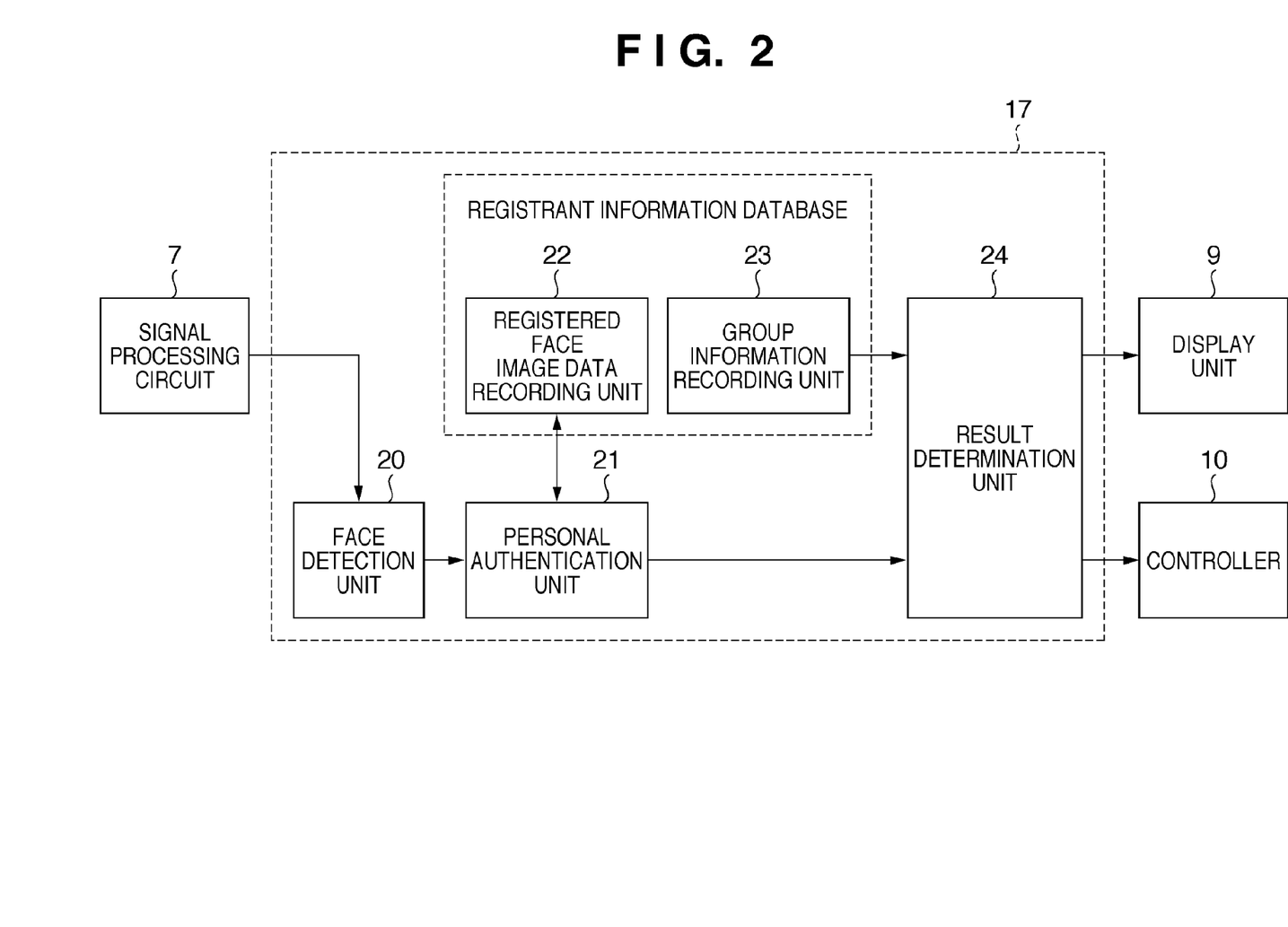
FIG. 2 is a block diagram illustrating the configuration of a face detection and personal authentication unit.

FIG. 1 is a block diagram illustrating the configuration of a digital camera according to a first embodiment of the present invention, and FIG. 2 is a block diagram illustrating the configuration of a face detection and personal authentication unit 17 shown in FIG. 1.

The digital camera of this embodiment uses an image sensor 3 to photoelectrically convert light that is the result of forming the image of an object by an optical system 1 and focusing lens 2. An analog signal that is output from the image sensor 3 is subjected to pre-processing by a pre-processing circuit 4 having a CDS circuit and amplifying circuit for removing output noise. The resulting signal is then digitized by an A/D converter 5 and the digital signal is subjected to a smear correction by a smear correcting circuit 6. Image data is then generated from the digital signal by a signal processing circuit 7.

The face detection and personal authentication unit 17 subjects the image data thus generated to face detection and personal authentication, described later, feeds back the result of face detection and the result of authentication to a controller 10 and displays these results together with the image data on a display unit 9. The controller 10 re-controls an exposure control circuit 14, white balance control circuit 15 and focusing control circuit 16, etc., using the results of face detection and authentication, and is so adapted that a desired object can be imaged at higher quality. When a full-stroke switch 12 is pressed, image data that is output from the signal processing circuit 7 is recorded on a recording medium 8.

As shown in FIG. 2, the face detection and personal authentication unit 17 includes a face detection unit 20, a personal authentication unit 21, a registered face image data recording unit 22, a group information recording unit 23 and a result determination unit 24. By way of example, the face detection unit 20 scans a template, which has been prepared for face detection, with respect to input image data and calculates correlation values at various positions in the input image data. A location that exhibits high correlation values is determined as being a face area. Another method that may be used is a face-area extraction method that utilizes a partial spatial method, etc.

The personal authentication unit 21 calculates the similarity between face image data detected from the input image data by the face detection unit 20 and face image data that has been registered in the registered face image data recording unit 22. A method that can be used to calculate similarity is as disclosed in Japanese Patent Laid-Open No. 2000-030065, that is, one that employs a KL expansion method of a Fourier spectrum after the size, angle and luminance, etc., of the input face image data have been normalized. An alternative method, as disclosed in Japanese Patent Laid-Open No. 2004-038531, is to normalize detected face image data in accordance with distance to a face and then perform pattern matching. It should be noted that the registered face image data defined in this specification is face image data per se, which has been compressed and stored, or information indicating a feature relating to the face, such as the eyes nose, mouth or eyebrows.

A plurality of items of registered face image data have been registered in the registered face image data recording unit 22 beforehand. Correlated with each item of registered face image data is the individual name (registered name) of the person. The group information recording unit 23 creates a group that includes at least one item of registered face image data from among the plurality of items of registered face image data that have been registered in the registered face image data recording unit 22. The group information recording unit 23 correlates and registers the personal names (registered names) of the registered face image data belonging to the group and the group name.

The result determination unit 24 performs a match of registered-individual information using the similarity calculated by the personal authentication unit 21 and the group information that has been registered in the group information recording unit 23. The result determination unit 24 changes what is displayed on the display unit 9 in accordance with authenticity, although the details of this operation will be described later.

The focusing operation of the camera is controlled by the focusing control circuit 16. Specifically, control is started by pressing a half-stroke switch 11. The focusing lens 2 is driven by a focusing lens drive circuit 13, the contrast of the object is detected from the image signal obtained by the image sensor 3 and the focusing lens 2 is driven to the contrast peak position.

The amount of exposure in the camera is controlled by the exposure control circuit 14. Specifically, the luminance level of a prescribed area in the captured image is measured, the amount of exposure that will result in a target luminance level is calculated and shutter speed or iris, etc., is controlled.

White balance is controlled by the white balance control circuit 15. A detailed description of this is omitted.

Figure 3:
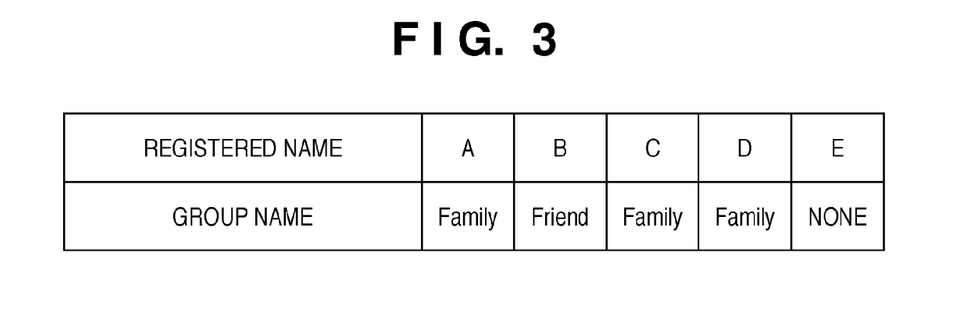
FIG. 3 illustrates registered names of persons for which registered face image data has been registered and group names in a first embodiment of the present invention.
Figure 4:
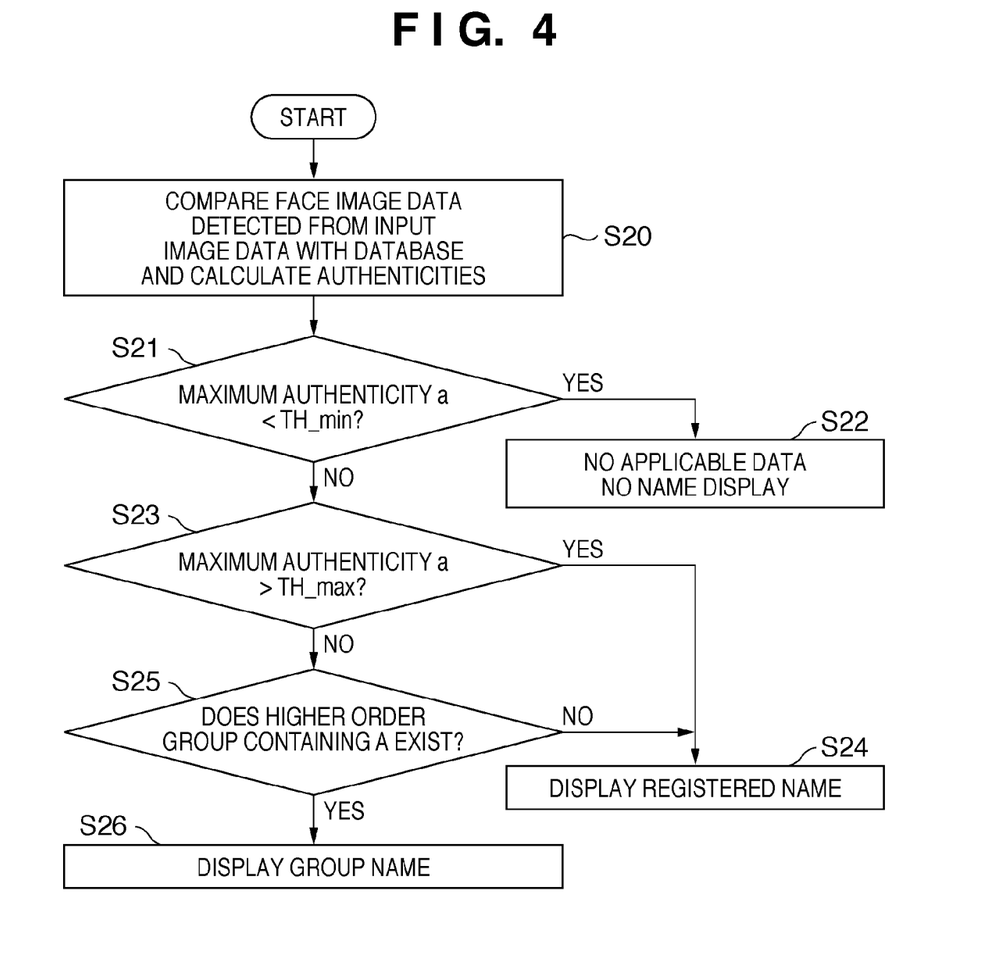
FIG. 4 is a flowchart of result determination processing according to a first embodiment of the present invention.
Figure 5:
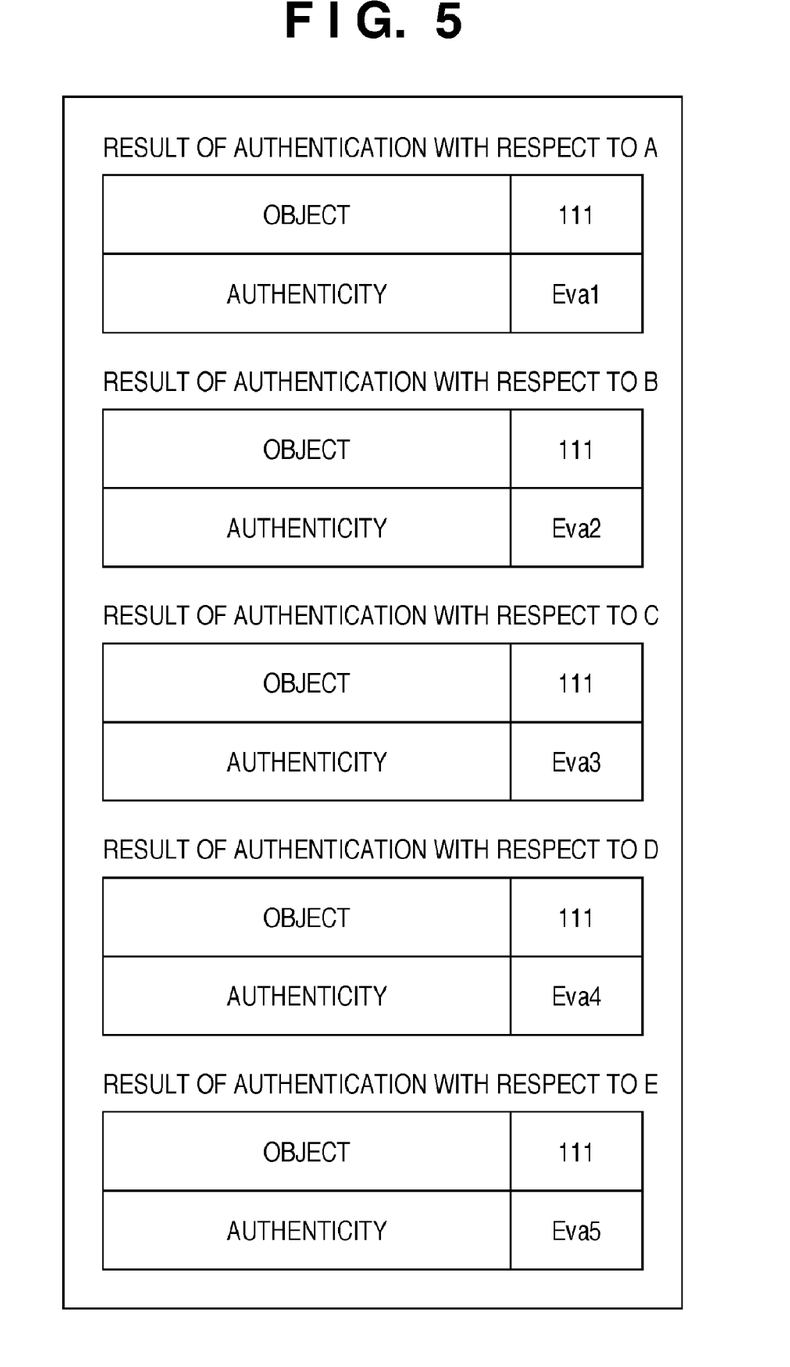
FIG. 5 is a diagram illustrating examples of detected face image data and authenticities of registered face image data in a first embodiment of the present invention.
Figure 6:
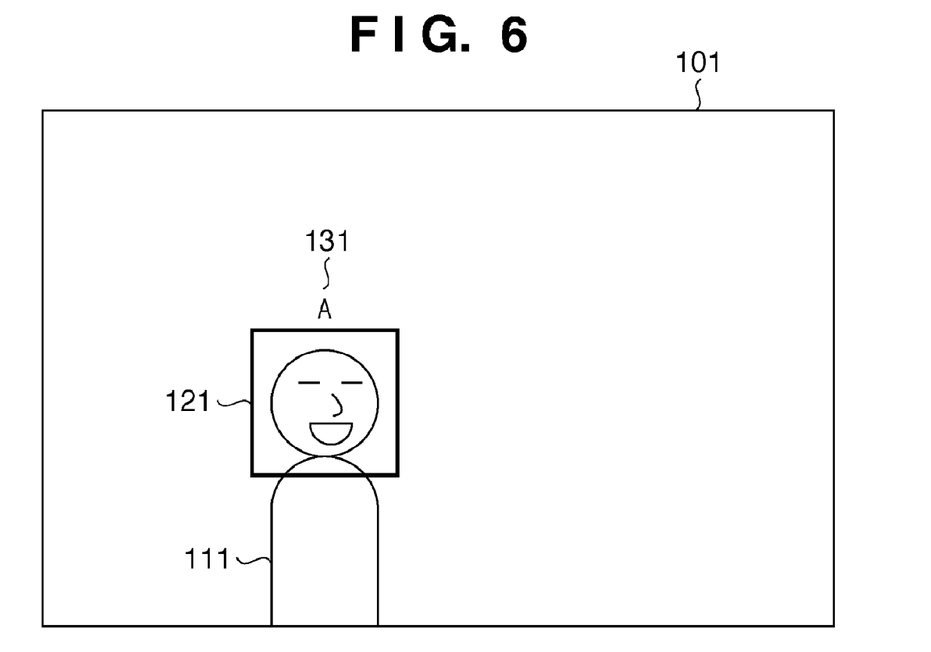
FIG. 6 is a diagram illustrating an example of result of recognition displayed on a display unit in a first embodiment of the present invention.
Figure 7:
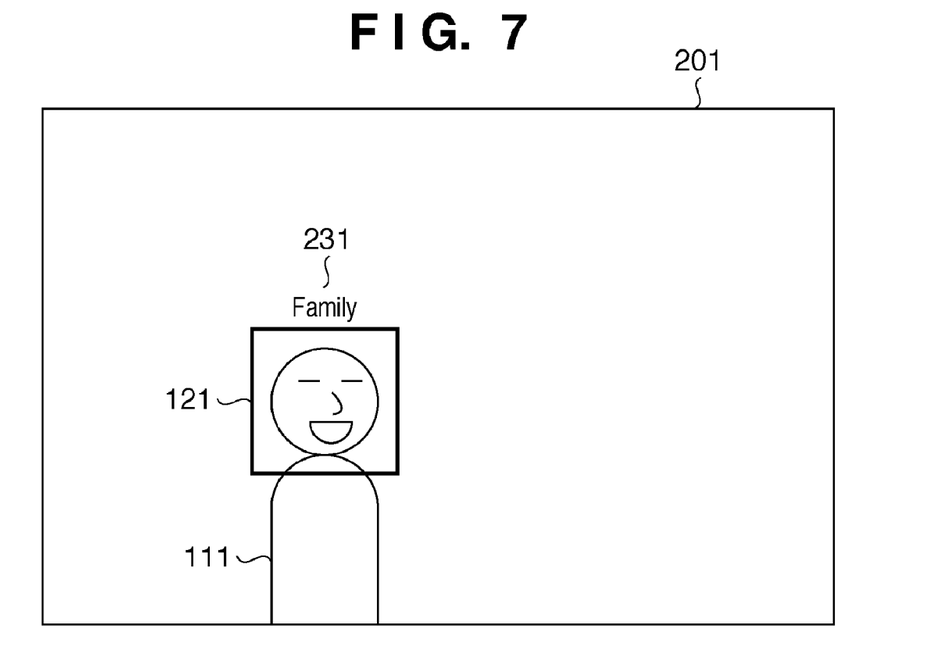
FIG. 7 is a diagram illustrating another example of result of recognition displayed on a display unit in a first embodiment of the present invention.

The operation of the result determination unit 24 will be described with reference to FIGS. 3 to 6. FIG. 3 illustrates the registered names of persons for which registered face image data has been registered and the group names to which these persons belong. This information has been registered in the group information recording unit 23. FIG. 4 is a flowchart of result determination processing according to the first embodiment, FIG. 5 is a diagram illustrating examples of detected face image data and authenticity of registered face image data in the first embodiment, FIG. 6 is a diagram illustrating an example of result of recognition displayed on the display unit 9 in accordance with authenticity in FIG. 5, and FIG. 7 is a diagram illustrating another example of result of recognition displayed on the display unit 9 in accordance with authenticity in FIG. 5.

In this embodiment, as illustrated in FIG. 3, registered face image data for five different persons has been registered in the registered face image data recording unit 22. The registered names of these persons have been registered as "A", "B", "C", "D" and "E". Furthermore, group names to which the persons A to D belong have been registered in the group information recording unit 23 in association with the names of the persons as "Family", "Friend", "Family" and "Family", respectively. It is assumed here that a group name corresponding to person E has not been registered.

The result determination unit 24 has a threshold value TH_min as a parameter for determining whether face image data detected by the face detection unit 20 is to be regarded as that of a person whose face image data is identical with the registered face image data in the registered face image data recording unit 22. The result determination unit 24 further has a first threshold value TH_max as a parameter for determining that the likelihood that erroneous authentication has not occurred in the personal authentication unit 21 is high.

In step S20 in FIG. 4, the personal authentication unit 21 compares face image data detected by the face detection unit 20 (this data shall be referred to as "detected face image data" below) and a plurality of items of registered face image data that have been registered in the registered face image data recording unit 22. The personal authentication unit 21 calculates evaluation values (referred to as "authenticities" below) indicating degrees to which the detected face image data matches the items of registered face image data. An example of a method of calculating authenticity is to decide a feature that indicates a shape such as that of an eye or mouth and decide authenticity from the reciprocal of a difference value of each feature between an item of detected face image data and an item of registered face image data. Another method is to find the overall correlation between detected face image data and registered face image data and adopt this correlation as the authenticity.

It will be assumed here that face image data of a person 111 (see FIGS. 6 and 7) has been detected from input image data by the face detection unit 20. In FIG. 5, authenticities of the detected face image data of person 111 with respect to the registered face image data of the five persons whose registered names are "A", "B", "C", "D" and "E" are expressed as Eva1, Eva2, Eva3, Eva4 and Eva5, respectively.

Next, in step S21, the result determination unit 24 determines the result of authentication using the authenticities obtained. Specifically, from among the authenticities with respect to each of the items of registered face image data obtained in step S21, the result determination unit 24 compares maximum authenticity a and the threshold value TH_min. Here it will be assumed that the authenticity Eva1 with respect to the registered face image data of the registered name "A" in FIG. 5 conforms to the maximum authenticity a. If the maximum authenticity a is less than the TH_min, then the result determination unit 24 determines that the face image data conforming to the detected face image data does not exist within the registered face image data and, in step S22, presents a display to the effect that there is no applicable data, as by forgoing display of a name on the display unit 9.

In step S23, the result determination unit 24 compares the maximum authenticity a and the threshold value TH_max. If the maximum authenticity a is larger than the threshold value TH_max, which is a value capable of assuring a satisfactory authentication accuracy, then the result determination unit 24 determines that the registered face image data and detected face image data corresponding to the maximum authenticity a are items of data of the same person. Control then proceeds to step S24. In step S24, the result determination unit 24 displays the registered name of this registered face image data on the display unit 9. That is, if it is determined that the authenticity Eva1 conforming to the maximum authenticity a is greater than the threshold value TH_max, then the display unit 9 displays the registered name "A" of the registered face image data corresponding to the authenticity Eva1.

This is illustrated in FIG. 6, which shows image 101 displayed on the display unit 9. The image 101 contains the person 111 and a face frame 121 is displayed so as to enclose the face of the person 111 detected by the face detection unit 20. The registered name "A" (131) indicating the result of recognition of this face is displayed above the face frame 121. By thus displaying the face frame 121 on the display unit 9 at the position of the detected face and displaying the registered name 131 above the face frame 121, the user can tell at a glance who has been recognized as having a particular face.

If the maximum authenticity a lies within the range TH_min<a<TH_max, the likelihood that face image data corresponding to the detected face image data exists in the registered face image data recording unit 22 is high but a satisfactory authentication accuracy is not assured. This means that there is a high likelihood that erroneous recognition will occur. In this case, the result determination unit 24 determines whether a higher order group containing registered face image data corresponding to the maximum authenticity a (the registered name is assumed to be "A") exists in the group information recording unit 23. As a result, if "A" has a higher order group name (assume that the group to which "A" belongs is "Family"), the group name "Family" to which "A" belongs is displayed on the display unit 9 at step S26.

This is illustrated in FIG. 7, which shows image 201 displayed on the display unit 9. The image 201 contains the same person 111 as that mentioned earlier and the face frame 121, which indicates that a face will be detected, is displayed enclosing the face of the person 111 detected by the face detection unit 20. The authenticity Eva1 conforms to the maximum authenticity a of person 111. Assume that Eva1 is larger than TH_min but smaller than TH_max. At this time the group name "Family" (231) indicating the result of recognition of this face is displayed above the face frame 121.

In accordance with this method, even if it is not possible to clearly distinguish between brothers or between sisters, for example, an authentication result indicative of "Family", which is a higher order concept, is displayed, thereby making it possible to avoid a situation in which an erroneous authentication result is reported to the user.

It should be noted that optimum values for the threshold values TH_min and TH_max used in steps S21 and S23 may be found experimentally.

In accordance with this embodiment, as described above, the name of a group to which an individual belongs is displayed for the user rather than a registered personal name in a case where authenticity is low. This makes it possible to reduce the possibility that an erroneous authentication result will be reported.

Second Embodiment

Next, the operation of the result determination unit 24 according to a second embodiment will be described with reference to FIGS. 8 to 11.

Figure 8:
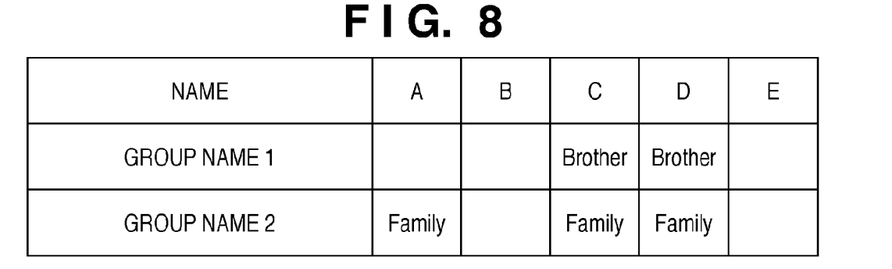
FIG. 8 illustrates registered names of persons for which registered face image data has been registered and group names in a second embodiment of the present invention.
Figure 9:
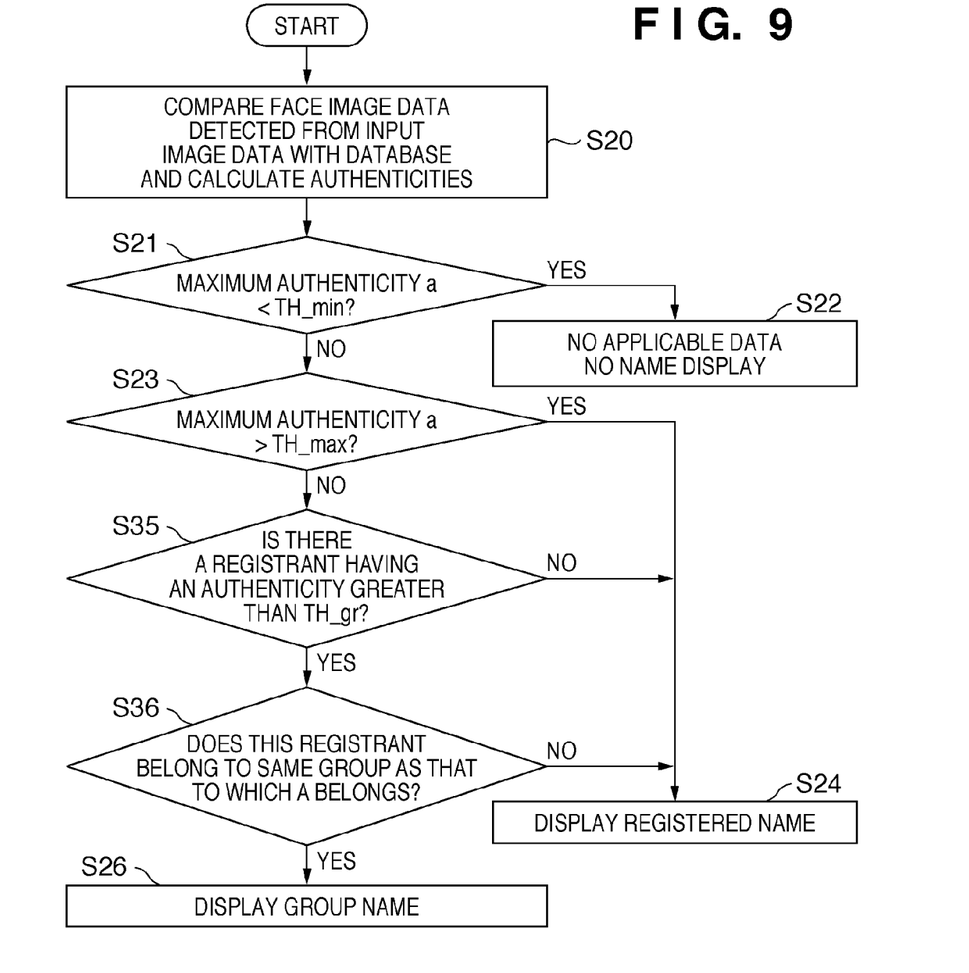
FIG. 9 is a flowchart of result determination processing according to a second embodiment of the present invention.
Figure 10:
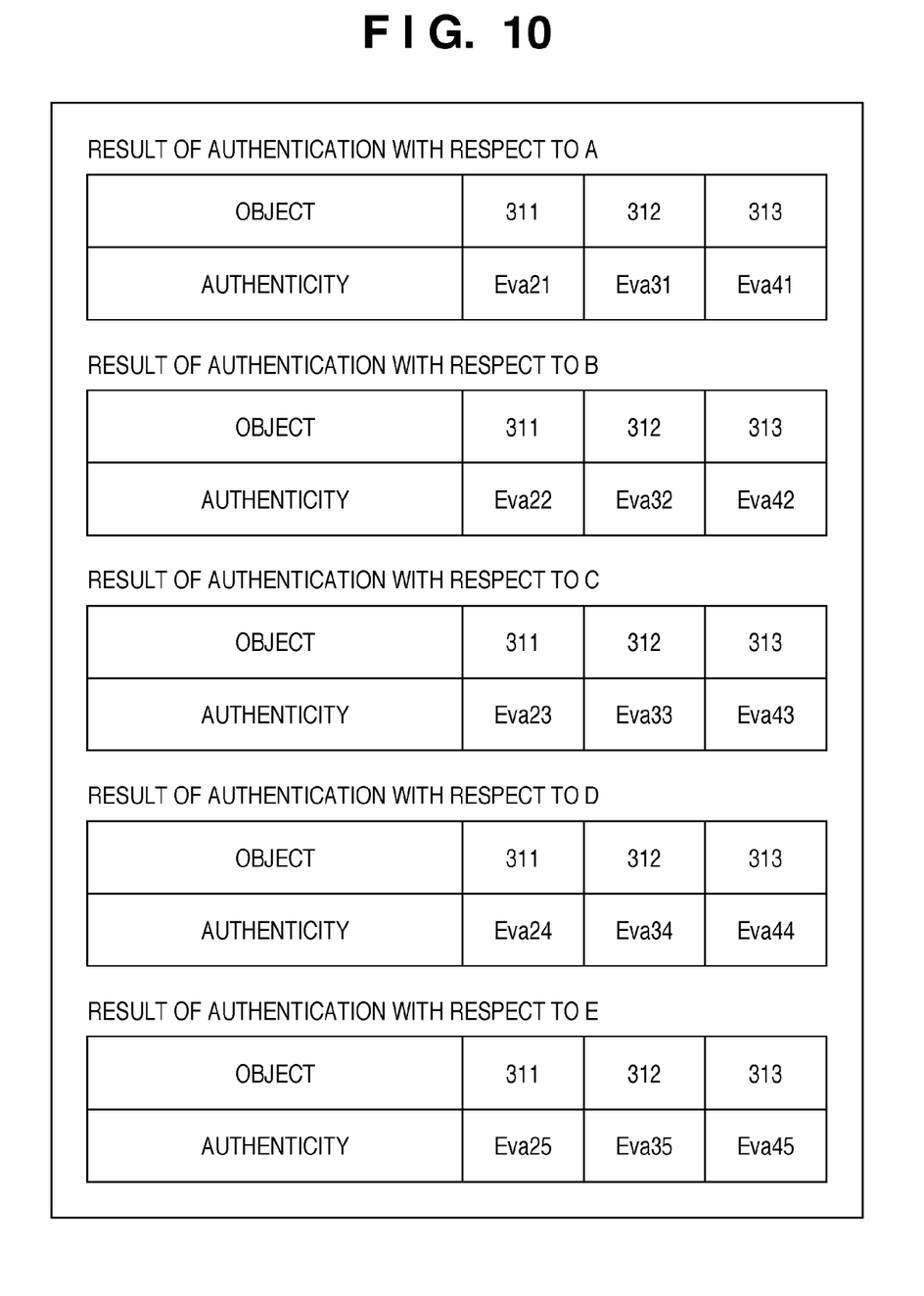
FIG. 10 is a diagram illustrating examples of detected face image data and authenticities of registered face image data in a second embodiment of the present invention.
Figure 11:
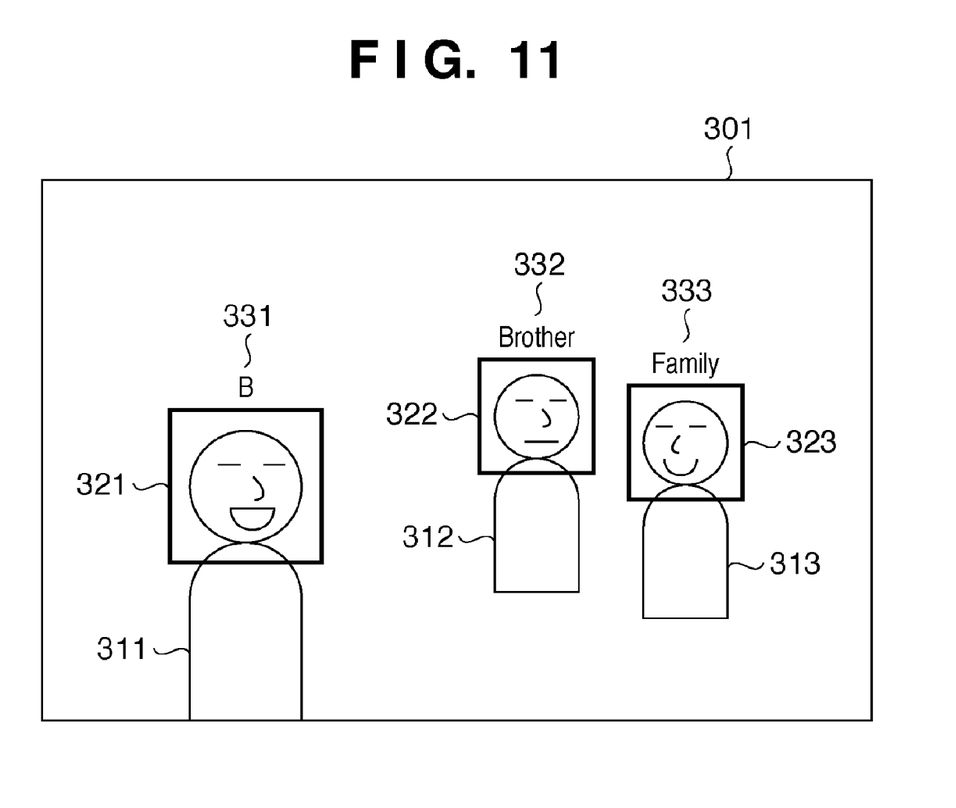
FIG. 11 is a diagram illustrating an example of result of recognition displayed on a display unit in a second embodiment of the present invention.

The configuration of the apparatus for implementing the second embodiment is the same as that shown in FIGS. 1A and 2 and need not be described again. FIG. 8 illustrates the registered names of persons for whom registered face image data has been registered, and group names to which these persons belong. FIG. 9 is a flowchart of result determination processing according to the second embodiment, FIG. 10 is a diagram illustrating examples of detected face image data and authenticities of registered face image data in the second embodiment, and FIG. 11 is a diagram illustrating an example of result of recognition displayed on the display unit 9 in the second embodiment.

FIG. 8 illustrates an example of authenticities of various items of registered face image data. In this embodiment, registered face image data for five different persons has been registered in the registered face image data recording unit 22. The registered names of these persons have been registered as "A", "B", "C", "D" and "E". Furthermore, it is assumed that the name of Group 1 to which only persons "C" and "D" belong has been registered as "Brother" and that the name of Group 2 to which persons "A", "C" and "D" belong has been registered as "Family".

This algorithm has threshold value TH_min as a parameter for determining whether detected face image data exists in a plurality of items of registered face image data that have been registered in the registered face image data recording unit 22, and threshold value TH_max as a parameter for determining that a satisfactory authenticity for which erroneous authentication will not occur has been obtained. Furthermore, the algorithm has a second threshold value TH_gr as a parameter for determining whether registered face image data having a high authenticity exists besides registered face image data indicating the maximum authenticity a.

The processing of steps S20 to S24 and S26 in FIG. 9 is the same as that of steps S20 to S24 and S26 in FIG. 2 described in the first embodiment and need not be described again.

Assume that face image data of persons 311, 312, 313 (see FIG. 11) has been detected from the input image data by the face detection unit 20. In FIG. 10, authenticities of the detected face image data of persons 311, 312, 313 with respect to the registered face image data of the five persons whose registered names are "A", "B", "C", "D" and "E" are shown. Specifically, the authenticities of the detected face image data of person 311 with respect to the registered face image data of the five persons are expressed as Eva21, Eva22, Eva23, Eva24 and Eva25, respectively, in FIG. 10. Similarly, the authenticities of the detected face image data of person 312 are expressed as Eva31, Eva32, Eva33, Eva34 and Eva35, respectively, in FIG. 10. Similarly, the authenticities of the detected face image data of person 313 are expressed as Eva41, Eva42, Eva43, Eva44 and Eva45, respectively, in FIG. 10.

If it is found in step S23 that the maximum authenticity a lies within the range TH_min<a<TH_max, the likelihood that face image data corresponding to the detected face image data exists in the registered face image data recording unit 22 is high but a satisfactory authentication accuracy is not assured. This means that there is a high likelihood that erroneous recognition will occur. Accordingly, at step S35, the result determination unit 24 determines whether there is other registered face image data the authenticity of which is greater than the threshold value TH_gr set in accordance with the maximum authenticity a.

The threshold value TH_gr is a value obtained by subtracting a prescribed value from the value of the maximum authenticity a and is set to a value greater than the threshold value TH_min and less than the threshold value TH_max. That is, the result determination unit 24 determines whether other recorded face image data for which an authenticity has been obtained that is not the maximum authenticity a but is near the maximum authenticity a exists. This prescribed value may be found experimentally.

Alternatively, the threshold value TH_gr may be made a fixed value.

If there is no registered face image data whose authenticity is greater than the threshold value TH_gr, then the registered name of the registered face image data for which the maximum authenticity a has been obtained is displayed on the display unit 9 in step S24. Control proceeds to step S36 if registered face image data whose authenticity is greater than the threshold value TH_gr exists.

In step S36, the result determination unit 24 determines whether the group name of the registered face image data for which the maximum authenticity a has been obtained and the group name of the registered face image data whose authenticity is greater than the threshold value TH_gr are identical. If the result of this comparison is that the groups to which these items of registered face image data belong are identical, it is understood that a higher order group that contains these exists and the possibility that an erroneous authentication has been made in this group is conceivable. In step S26, therefore, the name of the group to which the registered face image data having the maximum authenticity a belongs is displayed on the display unit 9.

On the other hand, if it is found in step S36 that registered face image data of maximum authenticity a does not belong to a group or that a group name to which registered face image data belongs that has an authenticity greater than the threshold value TH_gr is another group name, then control proceeds to step S24.

The registered name of the registered face image data of maximum authenticity a is displayed on the display unit 9 in step S24.

This situation will be described with reference to FIGS. 10 and 11.

The authenticities of person 311 with respect to the registered face image data of the registered names "A" to "E" are ranked as follows with regard to size:

$$Eva22<Eva25<TH\_gr<Eva23<Eva24<TH\_max<Eva21 \quad (1)$$

Similarly, the authenticities of person 312 with respect to the registered face image data of the registered names "A" to "E" are ranked as follows with regard to size:

$$Eva22<Eva25<Eva21<TH\_gr<Eva24<Eva23<TH\_max \quad (2)$$

Similarly, the authenticities of person 313 with respect to the registered face image data of the registered names "A" to "E" are ranked as follows with regard to size:

$$Eva22<Eva25<TH\_gr<Eva21<Eva23<Eva24<TH\_max \quad (3)$$

Since the authenticity Eva21 conforming to the maximum authenticity a of person 311 is greater than the threshold value TH_max, the result determination unit 24 determines that the result of authentication of person 311 is that the person is the person whose registered name is "A".

The authenticity Eva23 conforming to the maximum authenticity a of person 312 is less than the threshold value TH_max, and the authenticity Eva24 is greater than the threshold value TH_gr. Furthermore, the groups to which both the registered face image data corresponding to the authenticity Eva23 and the registered face image data corresponding to the authenticity Eva24 both belong in common are "Brother" and "Family". Here the group information recording unit 23 has set the priority of Group Name 1 higher than that of Group Name 2. As a consequence, the result determination unit 24 determines that the result of authentication of person 312 is that the person is one that belongs to the group name "Brother".

The authenticity Eva24 conforming to the maximum authenticity a of person 313 is less than the threshold value TH_max, and the authenticities Eva23, Eva21 are greater than the threshold value TH_gr. Furthermore, the group to which all of the registered face image data corresponding to the authenticities Eva24, Eva23, Eva21 belong in common is "Family". Consequently, the result determination unit 24 determines that the result of authentication of person 313 is that the person is one that belongs to the group name "Family".

The manner in which images are displayed on the display unit 9 at this time is as shown in FIG. 11. FIG. 11 illustrates an image 301 displayed on the display unit 9. The image 301 contains the persons 311, 312, 313 and face frames 321, 322, 323 are displayed so as to enclose the faces of the respective persons detected by the face detection unit 20.

The registered name "B" (331) indicating the result of recognition of this face, the group name "Brother" (332) and the group name "Family" (333) are displayed above the respective face frames. By thus displaying the face frames on the display unit 9 at the positions of the respective detected faces and displaying the registered name or group names above the face frames, the user can tell at a glance who has been recognized as having a particular face.

In accordance with this embodiment, as described above, the name of a group to which individuals that resemble one another belong is displayed for the user in case of such similar individuals that tend to be authenticated erroneously. This makes it possible to reduce the possibility that an erroneous authentication result involving two or more registered individuals that have similar features will be reported to the user.

Third Embodiment

Figure 12:
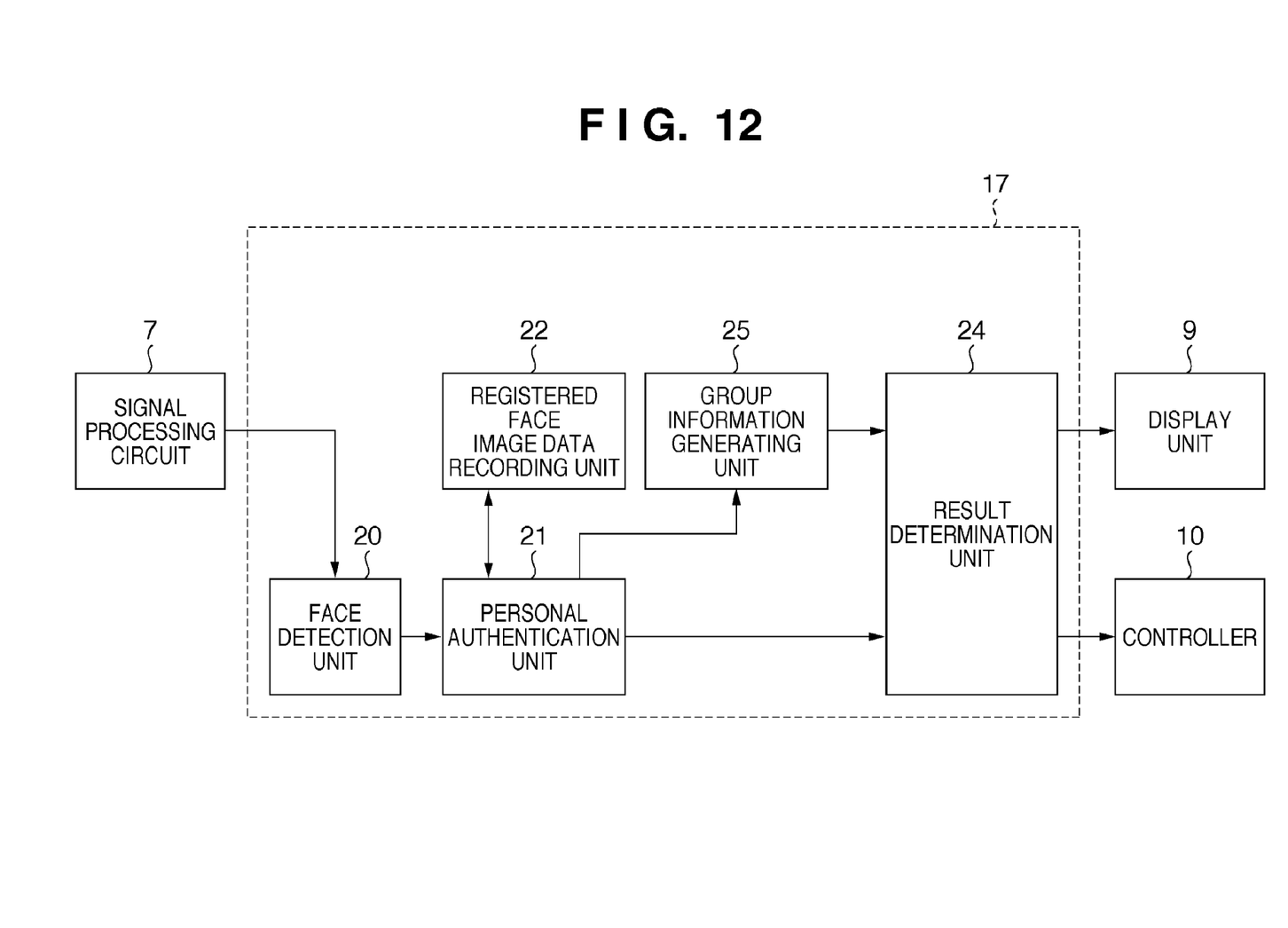
FIG. 12 is a block diagram illustrating the configuration of a face detection and personal authentication unit according to a third embodiment of the present invention.
Figure 13:
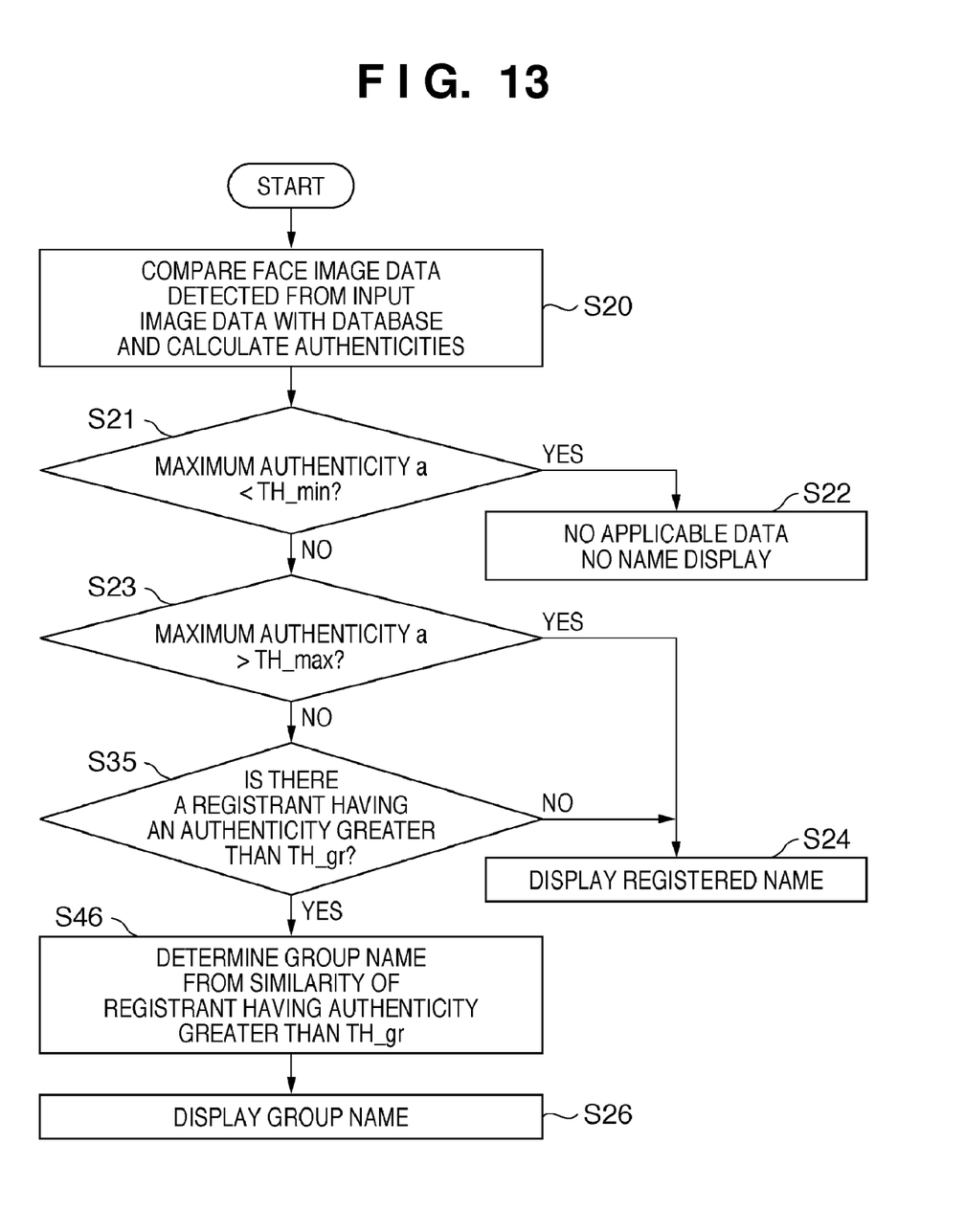
FIG. 13 is a flowchart of result determination processing according to a third embodiment of the present invention.

FIG. 12 is a block diagram illustrating the configuration of the face detection and personal authentication unit 17 of FIG. 1 according to this embodiment. Here the face detection and personal authentication unit 17 is such that the group information recording unit 23 is removed from the configuration of FIG. 2 and is replaced with a group information generator 25. FIG. 13 is a flowchart of result determination processing according to this embodiment.

The operation of the result determination unit 24 of this embodiment will be described with reference to FIGS. 12 and 13.

This embodiment differs from the first and second embodiments in that the group information generator 25 generates a group name automatically in a case where the personal authentication unit 21 has judged that a certain person resembles a plurality of other persons.

The processing of steps S20 to S24, S26 and S35 in FIG. 13 is the same as that of steps S20 to S24, S26 and S35 in FIG. 9 described in the second embodiment and need not be described again.

In a case where it is determined at step S35 that registered face image data the authenticity of which is larger than the threshold value TH_gr exists, control proceeds to step S46.

In step S46, the group information generator 25 compares the maximum authenticity a and authenticity that takes on a value larger than the threshold value TH_gr and generates a group name in accordance with the difference between the two.

For example, the group information generator 25 adopts "Brother/Sister" as a group name if the difference between these two authenticities is less than a predetermined threshold value, and adopts "Family" as a group name if the difference value is not less than the threshold value. Often it is more difficult to distinguish between brothers or between sisters than it is to distinguish between parent and child. Accordingly, if an authenticity having a value larger than the threshold value TH_gr is smaller than the predetermined threshold value, then it is determined that there is a high likelihood a person having the maximum authenticity a will be mistaken for a brother or sister. If the authenticity is greater than the threshold value, then it is determined that there is a high likelihood that persons will be mistaken as parent and child but not as brothers. It should be noted that this threshold value may be found experimentally by comparing face image data actually obtained from brothers or family members.

Fourth Embodiment

Figure 14:
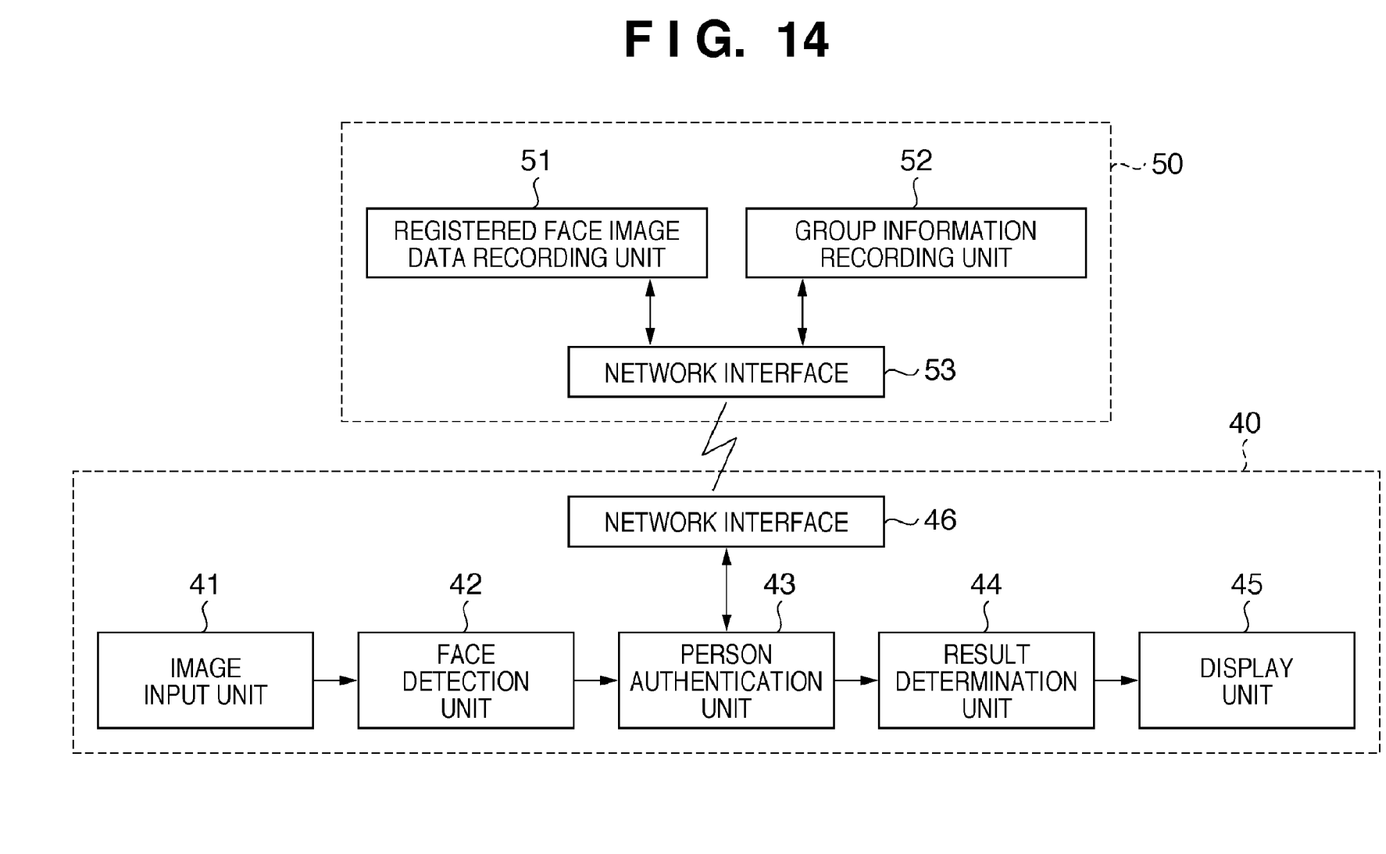
FIG. 14 is a block diagram illustrating the configuration of a face detection and personal authentication unit according to a fourth embodiment of the present invention.

FIG. 14 is a block diagram illustrating the configuration of a personal computer that has been connected to a network of an embodiment according to the present invention.

A personal computer 40 in this embodiment has an image input unit 41 for receiving image data. The image input unit 41 may be a reading unit for reading image data out of recording media or a communication unit for receiving image data transmitted from an external device or image data downloaded from a network.

A face detection unit 42, person authentication unit 43, result determination unit 44 and display unit 45 execute processing equivalent to that of the face detection unit 20, personal authentication unit 21, result determination unit 24 and display unit 9 shown in FIG. 2. A network interface 46 has a communication function by which the person authentication unit 43 obtains data from another device via the network.

In the first to third embodiments, the registered face image data recording unit 22, group information recording unit 23 and group information generator 25 are provided within the same device as that of the personal authentication unit 21.

By contrast, in this embodiment, a registered face image data recording unit 51 and a group information recording unit 52 are provided within a separate device 50 connected via a network to the personal computer 40 having the person authentication unit 43 and result determination unit 44.

That is, the person authentication unit 43 accepts data necessary for performing personal authentication from the registered face image data recording unit 51 and group information recording unit 52 within the device 50 via the network interface 46 and network interface 53 of the device 50. Naturally, not only the registered face image data recording unit 51 and group information recording unit 52 but also the image input unit 41, face detection unit 42 and display unit 45 may just as well be placed in a device separate from the person authentication unit 43 and result determination unit 44 and these may be allowed to communicate with each other. Thus, the present invention can be implemented even with a device other than a camera and can also be implemented in a system comprising a plurality of devices.

Other Embodiments

The present invention includes a case where it is attained also by supplying a computer program, which implements the functions of the foregoing embodiments, directly or remotely to a system or apparatus. In this case, a computer of the system, etc., reads out and then executes the computer program.

Accordingly, since the functional processing of the present invention is implemented by computer, the computer program per se installed in the computer also implements the present invention. In this case, so long as the system or apparatus has the functions of the program, the form of the program, for example, object code, a program executed by an interpreter or script data supplied to an operating system, etc., does not matter.

Examples of recording media (storage media) that can be used for supplying the program are a flexible disk, hard disk, optical disk, magneto-optical disk, CD-ROM, CD-R, CD-RW, magnetic tape, non-volatile type memory card, ROM, DVD (DVD-ROM, DVD-R), etc.

As for the method of supplying the program, a client computer can be connected to a website on the Internet using a browser possessed by the client computer, and the computer program per se of the present invention can be downloaded from the website. The program can also be supplied by downloading a compressed file, which has an automatic install function, to a recording medium such as a hard disk. Further, the computer program constituting the program of the present invention can be supplied by dividing it into a plurality of files and downloading the files from different websites. In other words, a WWW server that downloads, to multiple users, the program files that implement the functions of the present invention by computer also is included in the present invention.

Further, it is also possible to encrypt and store the program of the present invention on a storage medium such as a CD-ROM, distribute the storage medium to users and allow users who meet certain requirements to download decryption key information from a website via the Internet. In this case these users can be allowed to run the encrypted program by using the downloaded key information, whereby the program is installed in the user computer.

Further, the functions of the foregoing embodiments are implemented by having a computer execute a program that has been read. In addition, an operating system or the like running on the computer performs all or a part of the actual processing based upon the indications in the program. The functions of the embodiment can be implemented by this processing as well.

Furthermore, after the program read from the recording medium is written to a memory provided on a function expansion board inserted into the computer or provided in a function expansion unit connected to the computer, a CPU or the like mounted on the board or the like performs all or a part of the actual processing, whereby the functions of the foregoing embodiments are implemented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2008-156995, filed Jun. 16, 2008 and 2009-105610, filed Apr. 23, 2009, which are hereby incorporated by reference herein in their entirety.

What is claimed is:

1. An authentication apparatus comprising:
an authentication unit configured to compare at least one of face image data detected from image data and a plurality of items of registered face image data in a data recording unit and calculate each authenticity of the plurality of items of registered face image data with respect to the detected face image data based upon similarity between the detected face image data and the plurality of items of registered face image data; and
a result determination unit configured to compare a first authenticity, which is the maximum value from among the calculated authenticities of the plurality of items of registered face image data, with a first threshold value and determine that an authentication by said authentication unit is success if the first authenticity is greater than the first threshold value and that the authentication is failure if the first authenticity is not more than the first threshold value;
wherein a least part of the plurality of items of registered face image data in the data recording unit is associated with a name of a person corresponding to the item of registered face image data and a group name to which the person corresponding to the item of the registered face image data belongs, each group name is associated with two or more items of the registered face image data,
wherein said result determination unit determines whether the first authenticity is greater than a second threshold value which is greater than the first threshold value,
and displays a name of a person associated with an item of a first registered face image data of which a first authenticity is calculated on a display unit if the first authenticity is greater than the second threshold value,
and displays a group name but not a name of a person associated with the item of the first registered face image data on the display unit if the first authenticity is greater than the first threshold value but not more than the second threshold value and the group name is associated with the item of the first registered face image data.

2. The apparatus according to claim 1, wherein said result determination unit, even when the first authenticity is greater than the first threshold value but not more than the second threshold value and the person's name and the group name are associated with the item of the first registered face image data, compares the calculated authenticity of an item of a remaining registered face image data other than the item of the first registered face image data with a third threshold value which is greater than the first threshold value,
and displays a name of a person but not a group name associated with the item of the first registered face image data on the display unit if the calculated authenticity of the item of the remaining registered face image data is not greater than the third threshold value.

3. The apparatus according to claim 2, wherein when said result determination unit determines that the first authenticity is greater than the first threshold value but not more than the second threshold value and an item of a second registered face image data of which the calculated authenticity is greater than the third threshold value exist from among the item of the remaining registered face image data,
said result determination unit determines whether the group name associated with the item of the first registered face image data and the group name associated with the item of the second registered face image data are identical or not, and displays the group name on the display unit if the group names are identical, but displays the person's name associated with the item of the first registered face image data on the display unit if the group names are not identical.

4. An image sensing apparatus comprising:
an image sensor configured to sense the image of an object and generate image data;
a face detection unit configured to detect face image data of a person included in the image data obtained by said image sensor;

a face image data recording unit in which a plurality of items of registered face image data have been registered in advance;

a group information recording unit configured to create a group that includes at least one item of registered face image data from among the plurality of items of registered face image data, and associating registered names of face image data that belong to the group and a group name;

an authentication unit configured to compare at least one of face image data detected by the face detection unit and the plurality of items of registered face image data registered in said face image data recording unit and calculate each authenticity of the plurality of items of registered face image data with respect to the detected face image data based upon similarity between the detected face image data and the plurality of items of registered face image data; and a result determination unit configured to compare a first authenticity, which is the maximum value from among the calculated authenticities of the plurality of items of registered face image data, with a first threshold value and determine that an authentication by said authentication unit is success if the first authenticity is greater than the first threshold value and that the authentication is failure if the first authenticity is not more than the first threshold value;

wherein a least part of the plurality of items of registered face image data in the data recording unit is associated with a name of a person corresponding to the item of registered face image data and a group name to which the person corresponding to the item of the registered face image data belongs, each group name is associated with two or more items of the registered face image data, wherein said result determination unit determines whether the first authenticity is greater than a second threshold value which is greater than the first threshold value, and displays a name of a person associated with an item of a first registered face image data of which a first authenticity is calculated on a display unit if the first authenticity is greater than the second threshold value, and displays a group name but not a name of a person associated with the item of the first registered face image data on the display unit if the first authenticity is greater than the first threshold value but not more than the second threshold value and the group name is associated with the item of the first registered face image data.

5. An authentication method executed by a computer, comprising:

an authentication step of comparing at least one of face image data detected from image data and a plurality of items of registered face image data in a data recording unit and calculating each authenticity of the plurality of items of registered face image data with respect to the detected face image data based upon similarity between the detected face image data and the plurality of items of registered face image data; and a result determination step of comparing a first authenticity, which is the maximum value from among the calculated authenticities of the plurality of items of registered face image data, with a first threshold value and determining that an authentication by said authentication unit is success if the first authenticity is greater than the first threshold value and that the authentication is failure if the first authenticity is not more than the first threshold value;

wherein a least part of the plurality of items of registered face image data in the data recoding unit is associated with a name of a person corresponding to the item of registered face image data and a group name to which the person corresponding to the item of the registered face image data belongs, each group name is associated with two or more items of the registered face image data, wherein said result determination step comprises determining whether the first authenticity is greater than a second threshold value which is greater than the first threshold value, and displaying a name of a person associated with an item of a first registered face image data of which a first authenticity is calculated on a display unit if the first authenticity is greater than the second threshold value, and displaying a group name but not a name of a person associated with the item of the first registered face image data on the display unit if the first authenticity is greater than the first threshold value but not more than the second threshold value and the group name is associated with the item of the first registered face image data.

6. An authentication apparatus comprising:

an authentication unit configured to compare at least one of face image data detected from image data and a plurality of items of registered face image data in a data recording unit and calculate each authenticity of the plurality of items of registered face image data with respect to the detected face image data based upon similarity between the detected face image data and the plurality of items of registered face image data; and a result determination unit configured to compare a first authenticity, which is the maximum value from among the calculated authenticities of the plurality of items of registered face image data, with a first threshold value and determine that an authentication by said authentication unit is success if the first authenticity is greater than the first threshold value and that the authentication is failure if the first authenticity is not more than the first threshold value;

wherein the plurality of items of registered face image data in the data recording unit is associated with a name of a person corresponding to the item of registered face image data, wherein said result determination unit determines whether the first authenticity is greater than a second threshold value which is greater than the first threshold value, and displays a name of a person associated with an item of a first registered face image data of which a first authenticity is calculated on a display unit if the first authenticity is greater than the second threshold value, and if the first authenticity is greater than the first threshold value but not more than the second threshold value, said result determination unit compares the calculated authenticity of an item of a remaining registered face image data other than the item of the first registered face image data with a third threshold value which is greater than the first threshold value, determines whether an item of a second registered face image data of which the calculated authenticity is greater than the third threshold value exists from among the item of the remaining registered face image data and displays a group name in accordance with a difference between the calculated authenticity of the item of the second registered face image data and the first authenticity if the item of the second registered face image data exist.

7. An authentication method comprising:

an authentication step of comparing at least one of face image data detected from image data and a plurality of items of registered face image data in a data recording unit and calculating each authenticity of the plurality of items of registered face image data with respect to the detected face image data based upon similarity between the detected face image data and the plurality of items of registered face image data; and a result determination step of comparing a first authenticity, which is the maximum value from among the calculated authenticities of the plurality of items of registered face image data, with a first threshold value and determining that an authentication by said authentication unit is success if the first authenticity is greater than the first threshold value and that the authentication is failure if the first authenticity is not more than the first threshold value;

wherein the plurality of items of registered face image data in the data recording unit is associated with a name of a person corresponding to the item of registered face image data, wherein said result determination step comprises determining whether the first authenticity is greater than a second threshold value which is greater than the first threshold value, and displaying a name of a person associated with an item of a first registered face image data of which a first authenticity is calculated on a display unit if the first authenticity is greater than the second threshold value, and if the first authenticity is greater than the first threshold value but not more than the second threshold value, said result determination step comprises determining the calculated authenticity of an item of a remaining registered face image data other than the item of the first registered face image data with a third threshold value which is greater than the first threshold value, determining whether an item of a second registered face image data of which the calculated authenticity is greater than the third threshold value exists from among the item of the remaining registered face image data and displaying a group name in accordance with a difference between the calculated authenticity of the item of the second registered face image data and the first authenticity if the item of the second registered face image data exist.

* * * * *